US007648801B2

(12) United States Patent
Dahn et al.

(10) Patent No.: US 7,648,801 B2

(45) Date of Patent: Jan. 19, 2010

(54) REDOX SHUTTLE FOR OVERDISCHARGE PROTECTION IN RECHARGEABLE LITHIUM-ION BATTERIES

(75) Inventors: Jeffrey R. Dahn, Hubley (CA); Jun Chen, Downers Grove, IL (US)

(73) Assignee: 3M Innovative Properties Company, St. Paul, MN (US)

( * ) Notice: Subject to any disclaimer, the term of this patent is extended or adjusted under 35 U.S.C. 154(b) by 804 days.

(21) Appl. No.: 11/095,185

(22) Filed: Mar. 31, 2005

(65) Prior Publication Data

US 2005/0221168 A1 Oct. 6, 2005

Related U.S. Application Data

(60) Provisional application No. 60/558,509, filed on Apr. 1, 2004.

(51) Int. Cl.
*H01M 4/58* (2006.01)
*H01M 6/04* (2006.01)
*H01G 9/022* (2006.01)

(52) U.S. Cl. .................. 429/231.95; 429/188; 252/62.2

(58) Field of Classification Search ....................... None
See application file for complete search history.

(56) References Cited

U.S. PATENT DOCUMENTS 4,857,423 A 8/1989 Abraham et al.
4,869,977 A 9/1989 Connolly et al.
4,888,255 A 12/1989 Yoshimitsu et al.
4,935,316 A 6/1990 Redey
5,278,000 A 1/1994 Huang et al.
5,536,599 A 7/1996 Alamgir et al.
5,709,968 A 1/1998 Shimizu
5,759,714 A 6/1998 Matsufuji et al.

(Continued)

FOREIGN PATENT DOCUMENTS

EP 0 759 641 2/1997

(Continued)

OTHER PUBLICATIONS

JP 05-041251—IPDL machine translation.*

(Continued)

*Primary Examiner*—Dah-Wei D Yuan
*Assistant Examiner*—Maria J Laios
(74) *Attorney, Agent, or Firm*—Stephen F. Wolf

(57) ABSTRACT

A battery of series-connected rechargeable lithium ion cells each of which contains a negative electrode; a negative electrode current collector; a positive electrode; a positive electrode current collector; and an electrolyte comprising charge carrying medium, lithium salt and cyclable redox chemical shuttle. The negative electrode has a larger i rreversible first cycle capacity loss than that of the positive electrode, and is driven to a potential above that of the positive electrode if the cell is discharged to a state of cell reversal. The shuttle has an electrochemical potential above the positive electrode maximum normal operating potential, and prevents the negative electrode potential from reaching even higher and more destructive positive values during overdischarge. The current collector has a lithium alloying potential below the negative electrode minimum normal operating potential. The battery chemically limits or eliminates cell damage due to repeated overdischarge, and may operate without electronic overdischarge protection circuitry.

23 Claims, 7 Drawing Sheets

10
24
27
18
14
20
12
16
26

U.S. PATENT DOCUMENTS

| | | | | |
|---|---|---|---|---|
| 5,763,119 | A | 6/1998 | Adachi | |
| 5,858,573 | A | 1/1999 | Abraham et al. | |
| 5,879,834 | A | 3/1999 | Mao | |
| 5,882,812 | A | 3/1999 | Visco et al. | |
| 5,976,731 | A | 11/1999 | Negoro et al. | |
| 6,004,698 | A | 12/1999 | Richardson et al. | |
| 6,045,952 | A | 4/2000 | Kerr et al. | |
| 6,074,776 | A | 6/2000 | Mao et al. | |
| 6,074,777 | A | 6/2000 | Reimers et al. | |
| 6,203,944 | B1 | 3/2001 | Turner et al. | |
| 6,228,516 | B1 | 5/2001 | Denton, III et al. | |
| 6,248,481 | B1 | 6/2001 | Visco et al. | |
| 6,387,571 | B1 | 5/2002 | Lain et al. | |
| 6,503,662 | B1 | 1/2003 | Hamamoto et al. | |
| 6,544,691 | B1 | 4/2003 | Guidotti | |
| 6,596,439 | B1 | 7/2003 | Tsukamoto et al. | |
| 7,074,523 | B2 | 7/2006 | Arai et al. | |
| 2001/0004507 | A1 * | 6/2001 | Gan et al. | 429/332 |
| 2002/0001756 | A1 | 1/2002 | Hamamoto et al. | |
| 2003/0068561 | A1 | 4/2003 | Okahara et al. | |
| 2003/0099886 | A1 | 5/2003 | Choy et al. | |
| 2003/0129499 | A1 | 7/2003 | Choy et al. | |
| 2004/0028996 | A1 | 2/2004 | Hamamoto et al. | |
| 2004/0121239 | A1 * | 6/2004 | Abe et al. | 429/326 |
| 2004/0197664 | A1 | 10/2004 | Iriyama et al. | |
| 2005/0042519 | A1 | 2/2005 | Roh et al. | |
| 2005/0221196 | A1 | 10/2005 | Dahn et al. | |
| 2006/0263695 | A1 | 11/2006 | Dahn et al. | |
| 2006/0263697 | A1 | 11/2006 | Dahn et al. | |
| 2007/0020522 | A1 | 1/2007 | Obrovac et al. | |
| 2007/0020528 | A1 | 1/2007 | Obrovac et al. | |

FOREIGN PATENT DOCUMENTS

| | | | |
|---|---|---|---|
| EP | 0 776 058 | | 5/1997 |
| EP | 0 825 663 | | 2/1998 |
| EP | 1 160 905 A2 | | 12/2001 |
| EP | 1 361 622 A1 | | 11/2003 |
| GB | 1 066 928 | | 4/1967 |
| JP | 61-279061 | | 12/1986 |
| JP | 62-82649 | | 4/1987 |
| JP | 63-55861 | | 3/1988 |
| JP | 63-55868 | | 3/1988 |
| JP | 05-036439 | | 2/1993 |
| JP | 05-041251 | * | 2/1993 |
| JP | 5-258771 | | 8/1993 |
| JP | 05-295058 | | 11/1993 |
| JP | 6-338347 | | 6/1994 |
| JP | 07-302614 | | 11/1995 |
| JP | 8-115745 | | 5/1996 |
| JP | 09-050822 | | 2/1997 |
| JP | 10-050342 | | 2/1998 |
| JP | 10-321258 | | 12/1998 |
| JP | 2000-058116 | | 2/2000 |
| JP | 2000-058117 | | 2/2000 |
| JP | 2000-156243 | | 6/2000 |
| JP | 2000-228215 | | 8/2000 |
| JP | 2000-251932 | | 9/2000 |
| JP | 2000-277147 | | 10/2000 |
| JP | 2000-348725 | | 12/2000 |
| JP | 2001-015156 | | 1/2001 |
| JP | 2001-023687 | | 1/2001 |
| JP | 2001-196061 | * | 7/2001 |
| JP | 2001-210364 | | 8/2001 |
| JP | 2004-6400 | | 1/2004 |
| JP | 2006/073241 | | 3/2006 |
| WO | WO 00/03444 | | 1/2000 |
| WO | WO 01/29920 | | 4/2001 |
| WO | WO02/59999 | * | 1/2002 |
| WO | WO 03/081697 | | 10/2003 |

OTHER PUBLICATIONS

JP 2001-196061—IPDL machine translation.*

AIPN Machine translation of JP 07-302614.*

Balakrishnan, P.G., et al., "Safety Mechanisms in Lithium-Ion Batteries", *Journal of Power Sources*, vol. 155, No. 2, (Apr. 21, 2006), pp. 401-414.

Buhrmester et al., "Phenothiazine Molecules—Possible Redox Shuttle Additives for Chemical Overcharge and Overdischarge Protection for Lithium-Ion Batteries", *J. Electrochem. Soc.*, vol. 153, No. 2, (2006), pp. A288-A294.

Burdon et al., "Aromatic Polyfluoro-compounds. Part XIX.[1] The Preparation of Some Polyfluorodi- and Polyfluorotri-phenylamines", *J. Chem. Soc.*, (1964), pp. 5017-5021.

Dapperheld et al., "Substituted Triarylamine Cation-Radical Redox Systems—Synthesis, Electrochemical and Spectroscopic Properties, Hammet Behavior, and Suitability as Redox Catalysts", *Chem. Ber.*, vol. 124, (1991), pp. 2557-2567.

Miller et al., "Reactions of polyfluoroarenes with hexamethyldisilazane and with 1,1,1-trimethyl-N,N-bis(trimethylsilyl) stannaneamine in the presence of caesium fluoride", *J. of Fluorine Chemistry*, vol. 75, (1995), pp. 169-172.

Schmidt et al., "Elektrochemische und spektroskopische Untersuchung bromsubstituierter Triarylamin-Redoxsysteme", *Chem. Ber.*, vol. 113, (1980), pp. 577-585.

Wang et al., "Calculations of Oxidation Potentials of Redox Shuttle Additives for Li-Ion Cells", *J. of Electrochem. Soc.*, vol. 153, No. 2, (2006), pp. A445-A449.

Walter, "Triarylaminium Salt Free Radicals", *J. Am. Chem. Soc.*, vol. 77, (1955), pp. 5999-6002.

K.M. Abraham et al., *J. Electrochem. Soc.*, 137, 1856 (1988).

K. M. Colbow et al., *J. Power Sources* 26, 397-402 (1989).

S. R. Narayanan et al., *J. Electrochem. Soc.*, 138, 2224 (1991).

M. N. Golovin et al., *J. Electrochem. Soc.*, 139, 5 (1992).

A. M. Wilson et al., *J. Electrochem. Soc.*, 142, 326-332 (1995).

T.J. Richardson et al., *J. Electrochem. Soc.*, 143, 3992-96 (1996).

M. Adachi et al., *J. Electrochem. Soc.* 146, 1256 (1999).

T. D. Hatchard et al., *Electrochemical and Solid-State Letters*, 3 (7) 305-308 (2000).

D. D. MacNeil et al., A DSC Comparison of Various Cathodes for Li-ion Batteries, *J. Power Sources*, 108 (1-2): 8-14 (2002).

Xu et al., *Electrochemical and Solid-State Letters*, 5 (11) A259-A262 (2002).

Xu et al., *Electrochemical and Solid-State Letters*, 6 (6) A117-A120 (2003).

Lee et al., *Korean J. Chem. Eng.*, 19(4) 645-652 (2002).

Amatore et al., *Journal of Electroanalytical Chemistry* 462 55-62 (1999).

Sun et al., *J. Am. Chem. Soc.* 126 1388-1401 (2004).

Johnston et al., *Langmuir* 7 289-296 (1991).

* cited by examiner

REDOX SHUTTLE FOR OVERDISCHARGE PROTECTION IN RECHARGEABLE LITHIUM-ION BATTERIES

CROSS-REFERENCE TO RELATED APPLICATION

This application claims the benefit of the filing date of Provisional Application No. 60/558,509 filed Apr. 1, 2004, the disclosure of which is incorporated herein by reference.

FIELD OF THE INVENTION

This invention relates to overdischarge protection in rechargeable lithium-ion batteries.

BACKGROUND

Various chemical moieties have been proposed for imparting overcharge protection to rechargeable lithium-ion cells. Chemical moieties designated as "redox shuttles" or "shuttles" will in theory provide an oxidizable and reducible charge-transporting species that may repeatedly transport charge between the negative and positive electrodes once the charging potential reaches a desired value. Materials that function as fuses or shunts to provide one-time or limited-time cell overcharge protection have also been proposed. References relating to rechargeable lithium-ion cell additives or rechargeable lithium-ion cell construction include U.S. Pat. No. 4,857,423 (Abraham et al. '423), U.S. Pat. No. 4,888,255 (Yoshimitsu et al.), U.S. Pat. No. 4,935,316 (Redey), U.S. Pat. No. 5,278,000 (Huang et al.), U.S. Pat. No. 5,536,599 (Alamgir et al.), U.S. Pat. No. 5,709,968 (Shimizu), U.S. Pat. No. 5,763,119 (Adachi), U.S. Pat. No. 5,858,573 (Abraham et al. '573), U.S. Pat. No. 5,879,834 (Mao), U.S. Pat. No. 5,882,812 (Visco et al. '812), U.S. Pat. No. 6,004,698 (Richardson et al. '698), U.S. Pat. No. 6,045,952 (Kerr et al.), U.S. Pat. No. 6,074,776 (Mao et al.), U.S. Pat. No. 6,074,777 (Reimers et al.), U.S. Pat. No. 6,228,516 B1 (Denton, III et al.), U.S. Pat. No. 6,248,481 B1 (Visco et al. '481), U.S. Pat. No. 6,387,571 B1 (Lain et al.), U.S. Pat. No. 6,596,439 B1 (Tsukamoto et al.) and U.S. Pat. No. 6,503,662 B1 (Hamamoto et al. '662); U.S. Patent Application Publication Nos. US 2002/0001756 A1 (Hamamoto et al. '756), US 2003/0068561 A1 (Okahara et al.), US 2004/0028996 A1 (Hamamoto et al. '996) and US 2004/0121239 A1 (Abe et al.); European Patent No. EP 0 776 058 B1 (Moli Energy (1990) Ltd.); Japanese Published Patent Application Nos. 4-055585 (Fuji Electro Chemical Co. Ltd.), 5-036439 (Sony Corp.), 5-258771 (Fuji Denko, Co. Ltd.), 6-338347 (Sony Corp.), 7-302614 (Sony Corp.), 8-115745 (Japan Storage Battery Co., Ltd.),9-050822 (Sony Corp.), 10-050342 (Sony Corp.), 10-321258 (NEC Moli Energy Canada, Ltd.), 2000-058116 (Sanyo Electric Co. Ltd.), 2000-058117 (Sanyo Electric Co. Ltd.), 2000-156243 (Sony Corp.), 2000-228215 (Sanyo Electric Co. Ltd.), 2000-251932 (Sony Corp.), 2000-277147 (Sony Corp.) and 2001-2103645 (Mitsubishi Chemicals Corp.); PCT Published Patent Application Nos. WO 01/29920 A1 (Richardson et al. '920) and WO 03/081697 A1 (Goh et al.); K.M. Abraham et al., *J. Electrochem. Soc.,* 137, 1856 (1988); L. Redey, The Electrochemical Society Fall Meeting, Chicago, Illinois, *Extended Abstracts,* 88-2 (Oct. 9-14, 1988); K. M. Colbow et al., *J. Power Sources* 26, 397-402 (1989); S. R. Narayanan et al., *J. Electrochem. Soc.,* 138, 2224 (1991); M. N. Golovin et al., *J. Electrochem. Soc.,* 139, 5 (1992); NTIS Funding Report No. 17908, Optimization of Electrolyte Batteries, Principal Investigator K. M. Abraham, Eic Laboratory, Inc., (1992); A. M. Wilson et al., *J. Electrochem. Soc.,* 142, 326-332 (1995); T. J. Richardson et al., *J. Electrochem. Soc.,* 143, 3992-96 (1996); "NEW TECHNOLOGY:Rechargeable Cell Overcharge Protection", *Battery & EV Technology,* 21, 3 (Feb. 1, 1997); M. Adachi et al., *J. Electrochem. Soc.* 146, 1256 (1999); T. D. Hatchard et al., *Electrochemical and Solid-State Letters,* 3 (7) 305-308 (2000), D. D. MacNeil et al., *J. Power Sources,* 108 (1-2): 8-14 (2002), D. Y. Lee et al., *Korean Journal of Chemical Engineering,* 19, 645 (2002), Xu et al., *Electrochemical and Solid-State Letters,* 5 (11) A259-A262 (2002) and Xu et al., *Electrochemical and Solid-State Letters,* 6 (6) A117-A120 (2003).

SUMMARY OF THE INVENTION

Although overcharge protection is often an important factor in rechargeable lithium-ion cell and battery design, overdischarge can also be a matter of concern, especially for batteries containing series-connected cells. If all cells in such a battery have identical capacities, then during discharge they should all reach zero volts at approximately the same time. However, if as is sometimes the case one cell is weaker than the other cells, then the weak cell can be driven to a negative potential before the remaining cells reach a zero potential. Depending on the respective irreversible capacity losses in the positive and negative electrodes, discharge of a weak cell can cause the positive electrode to be driven to abnormal potentials more negative than the negative electrode or the negative electrode to be driven to abnormal potentials more positive than the positive electrode. Either condition may be referred to as "reversal". When the cell goes into reversal the potential of the negative electrode is more positive than that of the positive electrode. In cases involving severe reversal the weak cell's negative electrode or its supporting charge collector may permanently fail, the electrolyte may decompose limiting the subsequent cycle life of the cell, or the battery may catch fire or explode. To reduce these dangers, rechargeable lithium-ion cells and batteries (or their associated devices or chargers) may include control electronics to prevent overdischarge. These control electronics can be expensive, and thus may be inappropriate for low cost devices such as flashlights, portable cassette players, radios and the like. Users of such devices may however be prone to operate them until the battery is completely discharged, at which point a weak cell in a series string may well have been driven far into reversal.

Some references have discussed the provision of overdischarge protection using a chemical moiety. For example, Japanese Published Patent Application No. 5-258771 says that overdischarge protection may be achieved in a cell by employing a cobalt complex that reacts with a lithium-graphite negative electrode to form a lithium-graphite-intercalation compound. Intercalation is said to be achieved because the cobalt complex is "more noble than the lithium metal potential but less noble than the lithium-graphite-intercalation compound". The complex operates within an electrochemical range defined by the characteristics of the negative electrode and its potential with respect to lithium metal. In a typical lithium-ion cell this range is very small, e.g. 0.1 V or less.

T. J. Richardson et al. in *J. Electrochem. Soc.,* 143, 3992-96 (1996) also discuss overdischarge protection. Richardson et al. say that "Redox shuttle overdischarge protection in a battery system incorporating a lithium or Li-carbon electrode would require a mobile additive that is reduced at a potential lower than $Li/Li^+$ or $Li^+/LiC_n$ and unreactive toward the positive electrode. Such an additive is unlikely to be found".

The present invention employs redox shuttle additives that operate in an electrochemical range defined by the characteristics of the positive electrode and which can provide overdischarge protection in series-connected cells. This electrochemical range has a relatively wide window and thus enables use of known and newly-found redox shuttle additives. A negative electrode having a larger irreversible first cycle capacity loss than that of the positive electrode is employed, so that if a cell is driven into reversal the potential of the negative electrode is driven above that of the positive electrode. During overdischarge, the potential of the negative electrode therefore increases. However, the shuttle limits the negative electrode potential to a value slightly above that of the positive electrode maximum normal operating potential and prevents the negative electrode from reaching even higher and more destructive potentials. A negative electrode current collector whose lithium alloying potential is below the negative electrode minimum normal operating potential is also employed. This prevents the current collector from capturing lithium during recharging of the Li-ion cell. The resulting battery chemically limits or eliminates cell damage due to repeated overdischarge even though the negative electrode in a weak cell may be driven to a value more positive than the positive electrode potential.

The invention provides, in one aspect, a battery comprising a plurality of series-connected rechargeable lithium ion cells each comprising a negative electrode; a negative electrode current collector; a positive electrode; a positive electrode current collector; and an electrolyte comprising charge carrying medium, lithium salt and cyclable redox chemical shuttle, wherein the negative electrode has a larger irreversible first cycle capacity loss than that of the positive electrode, the redox chemical shuttle has an electrochemical potential above the positive electrode maximum normal operating potential, and the negative current collector has a lithium alloying potential below the negative electrode minimum normal operating potential. In an optional further embodiment the electrode balance is adjusted (by using a larger capacity negative electrode than positive electrode) so that the shuttle can provide overcharge protection as well. Exemplary embodiments of the recited battery have displayed excellent capacity retention and rechargeability even after hundreds of severe overcharge/overdischarge cycles in batteries containing a deliberately weakened cell.

The invention provides in another aspect an electrical device comprising an electrical load (e.g., an electronic circuit, motor, illumination source or heat source) and the above-described battery. Exemplary embodiments of the recited device can be made without electronic overdischarge (and optionally without electronic overcharge) protection circuitry.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various drawings indicate like elements. The elements in the drawing are not to scale.

DETAILED DESCRIPTION

The phrase "negative electrode" refers to one of a pair of rechargeable lithium-ion cell electrodes that under normal circumstances and when the cell is fully-charged will have the lowest potential. We retain this terminology to refer to the same physical electrode under all cell operating conditions even if such electrode is temporarily (e.g, due to cell overdischarge) driven to or exhibits a potential above that of the other (the positive) electrode.

The phrase "positive electrode" refers to one of a pair of rechargeable lithium-ion cell electrodes that under normal circumstances and when the cell is fully-charged will have the highest potential. We retain this terminology to refer to the same physical electrode under all cell operating conditions even if such electrode temporarily (e.g, due to cell overdischarge) is driven to or exhibits a potential below that of the other (the negative) electrode.

The phrase "redox chemical shuttle" refers to an electrochemically reversible moiety that during charging of a lithium-ion cell can become oxidized at the cell's positive electrode, migrate to the cell's negative electrode, become reduced at the negative electrode to reform the unoxidized (or less-oxidized) shuttle species, and migrate back to the positive electrode.

The word "cyclable" when used in connection with a redox chemical shuttle refers to a shuttle that when exposed to a charging voltage sufficient to oxidize the shuttle to its radical cation and an overcharge charge flow equivalent to 100% of the cell capacity will provide at least two cycles of overcharge protection.

The phrase "irreversible first cycle capacity loss" refers to a portion of the initial capacity of an electrode in a rechargeable lithium-ion cell that is irrecoverably lost in the course of the cell's very first charge-discharge cycle.

The phrase "lithium alloying potential" when used in connection with a current collector refers to the potential below which the current collector may significantly react with lithium to form a lithium alloy-containing deposit on the current collector.

The phrase "dissolution potential" when used in connection with a current collector refers to the potential above which the current collector may significantly dissolve in or react with the electrolyte.

Figure 1:
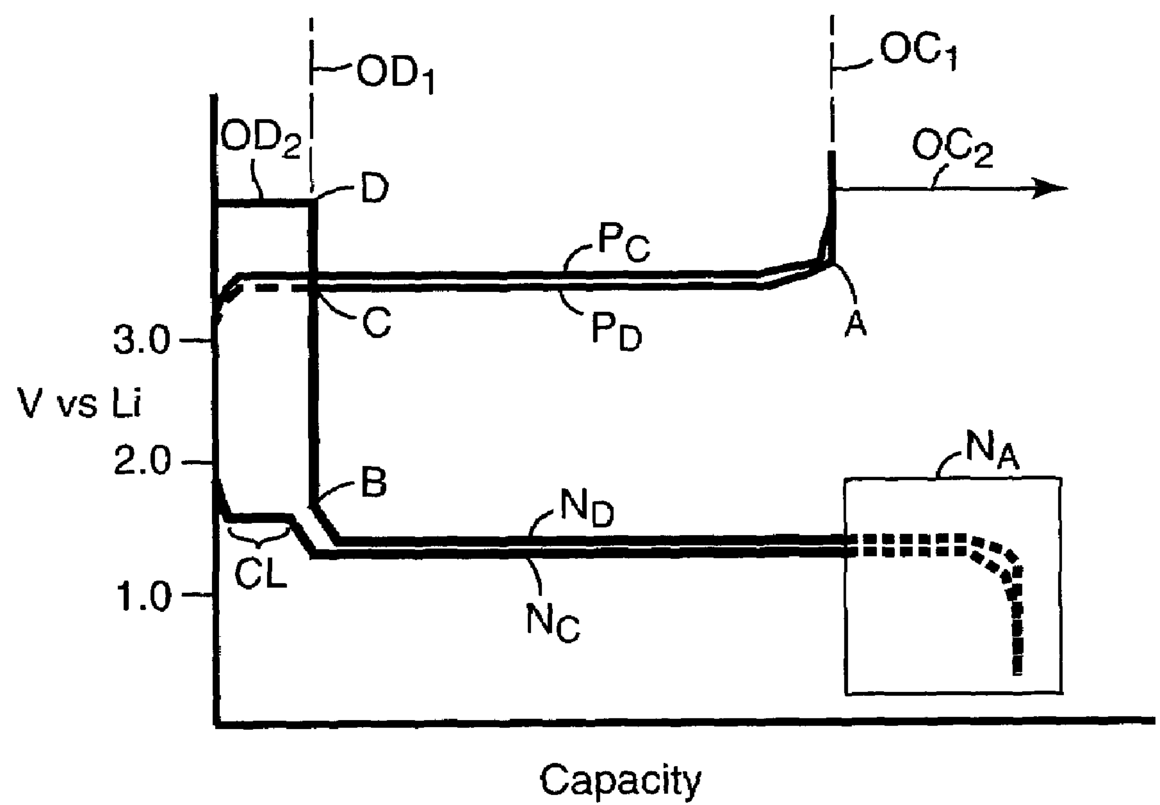
FIG. 1 is a plot showing voltage versus capacity during overcharging and overdischarging.

The shuttle's operation is illustrated schematically in FIG. 1, which depicts a plot of the potentials (vs. Li metal) of a $LiFePO_4$ positive and a negative electrode (not specified) on the vertical axis and capacity on the horizontal axis. Curve $P_C$ depicts the positive electrode potential during charge, and curve $P_D$ depicts the positive electrode potential during discharge. Curve $N_C$ depicts the negative electrode potential during charge, and curve $N_D$ depicts the negative electrode potential during discharge. The cell's terminal voltage during discharge is the vertical difference between curves $P_D$ and $N_D$, or Vpositive-Vnegative. The capacity difference depicted by bracket $C_L$ represents the negative electrode irreversible first cycle capacity loss that typically arises due to consumption of lithium atoms in the formation of a passivating or solid electrolyte interphase layer on the surfaces of the negative electrode particles during the cell's very first charge. Some cells will also exhibit an irreversible first cycle capacity loss for the positive electrode, but $LiFePO_4$ electrodes usually do not exhibit a significant amount of such capacity loss. Where one is present, the electrodes can be selected so that the negative electrode has a larger irreversible first cycle capacity loss than that of the positive electrode.

We optionally employ a negative electrode having a larger capacity than that of the positive electrode, and thereby obtain cells having overcharge protection as well as overdischarge protection. Then the depicted Box NA represents a region for such cells that will not be reachable during cell operation. All lithium will be removed from the positive electrode before this region can be reached.

During initial charging and subsequent recharging, both electrodes follow their V vs capacity curves and move simultaneously to the right in FIG. 1. When the positive electrode reaches point A, no further lithium can be extracted from the positive electrode and its potential rises sharply. Dashed line $OC_1$ represents the positive electrode potential if the shuttle is not present. Solid line $OC_2$ represents the positive electrode potential when the shuttle is present. The shuttle oxidizes and the oxidized shuttle molecules migrate to the negative electrode (where they are reduced), carrying a charge quantity corresponding to the applied charging current and preventing cell overcharge.

During discharge, both electrodes follow their V vs capacity curves and move simultaneously to the left in FIG. 1. The negative electrode runs out of lithium at point B, corresponding to its irreversible first cycle capacity loss. Because the positive electrode has not yet reached its own irreversible first cycle capacity loss, the negative electrode potential rises sharply. If the cell is operating in isolation and discharging through a load, the cell terminal voltage will reach zero volts at point C and the discharge will cease. However, if the cell is part of a series-connected battery and if the other cells in the series string have remaining capacity, the other cells will drive a discharge current through the illustrated cell and force the negative electrode potential above that of the positive electrode. Dashed line $OD_1$ represents the negative electrode potential if the shuttle is not present. If the negative electrode reaches a potential of about 5 volts vs. $Li/Li^+$, electrolyte decomposition may become rampant and the negative electrode may become irreversibly damaged or the cell may catch fire or explode. Solid line $OD_2$ represents the negative electrode potential when the shuttle is present. The shuttle oxidizes at the surface of the negative electrode, whose potential is higher than that of the positive electrode and equal to the shuttle potential. The oxidized shuttle molecules migrate to the positive electrode, whose potential is lower than that of the negative electrode. The oxidized shuttle molecules are reduced at the surface of the positive electrode, carrying a charge quantity corresponding to the driving discharge current and preventing further cell overdischarge. When the shuttle is present the negative electrode potential can go no higher than the shuttle potential (indicated at point D). During extended forced discharge, the shuttle prevents the negative electrode potential from reaching a level at which electrolyte decomposition might occur.

A variety of negative electrodes may be employed in lithium-ion batteries of the invention. Representative negative electrodes include $Li_{4/3}Ti_{5/3}O_4$; the lithium alloy compositions described in U.S. Pat. No. 6,203,944 (Turner '944), U.S. Pat. No. 6,255,017 (Turner '017), U.S. Pat. No. 6,436,578 (Turner et al. '578), U.S. Pat. No. 6,664,004 (Krause et al. '004) and U.S. Pat. No. 6,699,336 (Turner et al. '336); U. S. Patent Application Publication Nos. 2003/0211390 Al (Dahn et al. '390), 2004/013 1936 Al (Turner et al.) and 2005/0031957 Al (Christensen et al.); pending U. S. Patent Application Publication No. 2006/046144 (Obrovac); graphitic carbons e.g., those having a spacing between (002) crystallographic planes, $d_{002}$, of 3.45 Å>$d_{002}$>3.354 Å and existing in forms such as powders, flakes, fibers or spheres (e.g., mesocarbon microbeads); other materials that will be familiar to those skilled in the art; and combinations thereof.

A variety of current collectors may be employed in lithium-ion batteries of the invention. Often the negative and positive electrodes will be carried on the current collectors, with the current collector serving as a support. The current collector may also be an adjacent material, e.g., a shell of a lithium-ion button cell. A variety of arrangements will work, so long as the negative and positive electrodes make suitable electrical contact with their associated current collectors.

Some guidelines may aid in selecting the negative electrode current collector. To prevent lithium capture during recharging, the negative electrode current collector has a lithium alloying potential below the negative electrode's minimum normal operating potential. Thus the negative electrode current collector selection will be guided in part by the negative electrode selection. To discourage or prevent current collector dissolution during overdischarging, it may be helpful to employ a negative electrode current collector having a dissolution potential above the shuttle reduction potential. Thus the negative electrode current collector selection may also be guided in part by the shuttle selection.

Representative negative electrode current collectors include aluminum, copper, stainless steels (e.g., 300 series and 400 series stainless steels), titanium, tantalum, niobium, INCONEL™ nickel chromium alloys (commercially available from International Nickel Co.), combinations thereof and other materials that will be familiar to those skilled in the art. Aluminum has a lithium alloying potential of about 0.3 V vs Li. Most of the other listed materials are believed to have lithium alloying potentials below 0 V. Copper is believed to have a dissolution potential below about 4.0 V. Most of the other listed materials are believed to have dissolution potentials above 4.0 V. The current collector may be monolithic throughout, or may have a surface or exposed layer whose composition is different from the composition of the underlying current collector material. Aluminum appears to offer especially good performance.

When the negative electrode has a larger irreversible first cycle capacity loss than that of the positive electrode, the positive electrode will normally remain at an elevated potential during overdischarge. Its current collector will be held near the same elevated potential and will not be susceptible to lithium capture during recharging or dissolution during overdischarging. Accordingly there are fewer constraints on selection of the positive electrode current collector. Representative positive electrode current collectors include aluminum, stainless steels (e.g., 300 series and 400 series stainless steels), titanium, tantalum, niobium, INCONEL alloys, combinations thereof and other materials that will be familiar to those skilled in the art.

A variety of positive electrodes may be employed in lithium-ion batteries of the invention. Representative positive electrodes include $LiFePO_4$, $LiMnPO_4$, $LiMn_2O_4$ $LiCoPO_4$, and $LiCoO_2$; lithium transition metal oxides as disclosed in U.S. Pat. No. 5,858,324 (Dahn et al. '324), U.S. Pat. No. 5,900,385 (Dahn et al. '385), U.S. Pat. No. 6,143,268 (Dahn et al. '268) and U.S. Pat. No. 6,680,145 (Obrovac et al. '145); U. S. Patent Application Publication Nos. 2003/0027048 Al (Lu et al.), 2004/0121234 Al (Le) and 2004/0 179993 Al (Dahn et al. '993); U.S. Pat. No. 6,964,828 (Lu et al.), U.S. Pat. No. 7,078,128 (Lu et al.), U.S. Pat. No. 7,211,237 (Obrovac et al.), U. S. Patent Application Publication No. 2006/045144 (Obrovac); combinations thereof and other materials that will be familiar to those skilled in the art.

The negative or positive electrode may contain additives such as will be familiar to those skilled in the art, e.g., carbon black for negative electrodes, and carbon black, flake graphite and the like for positive electrodes.

The negative and positive electrode capacities may optionally be selected to provide an excess negative electrode capacity. This enables the shuttle to provide overcharge protection. About 10 to about 20% excess negative electrode capacity is recommended. Lesser or greater excess negative electrode capacities may be employed if desired.

A variety of charge carrying media may be employed in the electrolyte. Exemplary media are liquids or gels capable of solubilizing sufficient quantities of the lithium salt and the redox chemical shuttle so that a suitable quantity of charge can be transported from the positive electrode to negative electrode. Exemplary charge carrying media can be used over a wide temperature range, e.g., from about −30° C. to about 70° C. without freezing or boiling, and are stable in the electrochemical window within which the cell electrodes and shuttle operate. Representative charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme (bis(2-methoxyethyl) ether), combinations thereof and other materials that will be familiar to those skilled in the art.

A variety of lithium salts may be employed in lithium-ion batteries of the invention. Exemplary lithium salts are stable and soluble in the chosen charge-carrying media and perform well in the chosen lithium-ion cell, and include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, combinations thereof and other materials that will be familiar to those skilled in the art.

A variety of redox chemical shuttles may be employed in lithium-ion batteries of the invention. The shuttle has an electrochemical potential above (e.g., slightly above) the positive electrode's maximum normal operating potential. Thus the shuttle selection may be guided in part by the positive electrode selection. As a general numeric guide, the shuttle may for example have a redox potential about 0.3 to 0.6 V above the positive electrode's maximum normal operating potential, e.g., about 3.7 to about 4.7 V vs. $Li/Li^+$, about 3.7 to about 4.4 V vs. $Li/Li^+$, about 3.7 to about 4.2 V vs. $Li/Li^+$, or about 3.7 to about 4.0 V vs. $Li/Li^+$. For example, $LiFePO_4$ positive electrodes have a recharge plateau around 3.45 V vs. $Li/Li^+$, and exemplary shuttles for use with such electrodes may have a redox potential from about 3.75 to about 4.05 V vs. $Li/Li^+$. Similarly, $LiMnPO_4$ and $LiMn_2O_4$ electrodes have a recharge plateau around 4.1 V vs. $Li/Li^+$, and exemplary shuttles for use with such electrodes may have a redox potential from about 4.4 to about 4.7 V vs. $Li/Li^+$.

A variety of known and newly-discovered shuttles may be employed. One exemplary shuttle subclass contains an aromatic compound substituted with at least one tertiary carbon organic group and at least one alkoxy group. The tertiary carbon organic group may have the formula —$CR_3$ where each R group independently has up to 10, up to 6, up to 4, up to 2, or 1 carbon atom. Exemplary tertiary carbon organic groups may for example have up to 12, up to 10, up to 8, up to 6, 5, or 4 carbon atoms. Some shuttles in this subclass may contain two or at least two tertiary carbon organic groups which may be the same or different. If located on the same aromatic ring (e.g., a benzene ring), the tertiary carbon organic groups may for example be oriented ortho, meta or para to one another. The alkoxy group may have the formula —OR' where R' is an alkyl group having up to 10, up to 6, up to 4, up to 3, up to 2, or 1 carbon atom. Exemplary alkoxy groups may for example have 1 to 10, 1 to 6, 2 to 6, 1 to 4, 1 to 3 or 1 carbon atom. Some shuttles in this subclass may contain two or at least two alkoxy groups which may be the same or different. If located on the same aromatic ring the alkoxy groups may for example be oriented ortho, meta or para to one another. Exemplary shuttles in this subclass may for example contain 1 to 3 aromatic rings that are fused or connected. Each aromatic ring may for example be carbocyclic. Examples of such aromatic rings include benzene, naphthalene, anthracene, biphenyl, and the like. Other substituents may be present on the shuttle aromatic ring or rings or on the tertiary carbon organic group(s) or alkoxy group(s), so long as such substituents do not unduly interfere with factors such as the shuttle's charge-carrying capability, oxidation potential or stability. Shuttles in this subclass may also be in the form of a salt. This subclass is described further in copending filed even date herewith and U. S. Patent Application Publication No. 2005/0221196 (Dahn et al.), entitled "REDOX SHUTTLE FOR RECHARGEABLE LITHIUM-ION CELL", the disclosure of which is incorporated herein by reference.

Additional substituents may be present on the shuttle aromatic ring or rings or in the alkoxy or alkyl groups, so long as such additional substituents do not unduly interfere with the shuttle's charge-carrying capability, oxidation potential or stability. Some exemplary shuttle embodiments do not contain readily-polymerizable ring substituents (e.g., allyl groups) or halogen atoms. The shuttle may also be in the form of a salt.

Other shuttle subclasses that may be useful include metallocenes as shown, for example, in U.S. Pat. No. 5,526,599 (Alamgir et al.); anisoles and dianisoles as shown, for example, in U.S. Pat. No. 6,045,952 (Kerr et al.) and U.S. Pat. No. 5,763,119 (Adachi); halogenated aromatics as shown, for example, in U.S. Pat. No. 5,763,119 (Adachi), U.S. Pat. No. 5,709,968 (Shimizu), PCT Published Application No. WO 01/29920 A1 (Richardson et al. '920) and Japanese Patent Application Publication No. 2004/234948 (Iwao); tertiary-alkyl-substituted benzenes as shown, for example, in U.S. Pat. No. 6,503,662 (Hamamoto et al. '662) and U.S. Patent Application Publication No. 2004/0121239 (Abe et al.); dimethoxybenzenes, halogenated methoxybenzenes, substituted benzodioxazoles or methylenedioxybenzenes, alkyl polyethers, and substituted pyrimidines as shown, for example, in PCT Published Application No. WO 01/29920 A1 (Richardson et al. '920); highly-substituted aromatics as shown, for example, in U.S. Pat. No. 6,387,571 (Lain et al.); substituted biphenyls as shown, for example, in Japanese Patent Application Publication No. 2004/063112 (Kenji et al.); aromatic ethers and terphenyl derivatives as shown, for example, in Japanese Patent Application Publication No. 2000/058117 (Masatoshi et al.); urethane-substituted aromatics as shown, for example, in Japanese Patent Application Publication No. 2002/260730 (Takao et al.); nitrogen-containing aromatics as shown, for example, in U.S. Pat. No. 6,004,698 (Richardson et al. '698) and Japanese Patent Application Publication No. 06/338347 (Momoe et al.); thianthrenes as shown, for example, in U.S. Pat. No. 5,858,573 (Abraham et al.) and Japanese Patent Application Publication Nos. 2004/349132 (Masahiro et al.) and Ser. No. 07/302614 (Ryuichi et al.); and sulfur-based compounds as shown, for example, in U.S. Pat. No. 5,882,812 (Visco et al.).

Other shuttle subclasses that may be useful include the other redox shuttle molecules listed above, and molecules that are known to or hereafter become known to those skilled in the art for use as redox shuttles in rechargeable lithium-ion batteries.

Shuttles that may be useful include anisole, substituted anisoles (or methoxybenzenes) such as 2-methylanisole, 2-ethylanisole, 2-tert-butyl-anisole, 3-tert-butyl-anisole, 4-tert-butyl-anisole, 2-bromoanisole, 4-bromoanisole, 2,4,6-tribromoanisole, 3,5 dichloroanisole, 2,4,6-trichloroanisole, 4-bromo-2-fluoroanisole, 1-cyclopropyl-2-methoxybenzene, 1-nitro-3-tert-butyl-2-methoxybenzene, 1-cyano-3-tert-butyl-2-methoxybenzene, 1,4-di-tert-butyl-2-methoxybenzene, 5-tert-butyl-1,3-dinitro-2-methoxybenzene, 1-(benzyloxy)-4-bromo-2-methoxybenzene, 1,3,5-tri-tert-butyl-2-methoxybenzene, 1-[(2-ethylhexyl)oxy]-4-methoxybenzene, 1-hexadecyloxy-4-methoxybenzene, 1-((((ethoxycarbonyl)oxy)imino)methyl)-4-methoxybenzene and 2-tert-pentyl-anisole; alkoxy-substituted phthalates such as 4-methoxyphthalate; alkoxy-substituted catechols such as 3-methoxycatechol; substituted di-alkoxybenzenes such as 2-methyl-1,4-dimethoxybenzene, 2,3-dimethyl-1,4-dimethoxybenzene, 2,5-dimethyl-1,4-dimethoxybenzene, 2,6-dimethyl-1,4-dimethoxybenzene, 2,3,6-trimethyl-1,2-dimethoxybenzene,2,3,5,6-tetramethyl-1,4-dimethoxybenzene, 4-methyl-1,2-dimethoxybenzene, 2,3,5,6-tetramethyl-1,4-dimethoxybenzene, 2-ethyl-1,4-dimethoxybenzene, 2,3-diethyl-1,4-dimethoxybenzene, 2,5-diethyl-1,4-dimethoxybenzene, 2,6-diethyl-1,4-dimethoxybenzene, 2,3,6-triethyl-1,2-dimethoxybenzene, 2,3,5,6-tetraethyl-1,4-dimethoxybenzene, 4-ethyl-1,2-dimethoxybenzene, 2,5-diisopropyl-1,4-dimethoxybenzene, 2-tert-butyl-1,4-dimethoxybenzene, 2,3-di-tert-butyl-1,4-dimethoxybenzene, 2,5-di-tert-butyl-1,4-dimethoxybenzene, 2,5-di-tert-pentyl-1,4-dimethoxybenzene, 2,5-di-tert-butyl-3,6-di-nitro-1,4-dimethoxybenzene, 2,5-di-tert-butyl-3,6-di-cyano-1,4-dimethoxybenzene, 2,5-di-tert-butyl-1,4-dimethoxybenzene, 2,5-di-tert-butyl-1,4-diethoxybenzene, 2,5-dicyclohexyl-1,4-dimethoxybenzene, 4-tert-butyl-1,2-dimethoxybenzene, 4,5-di-tert-butyl-1,2-dimethoxybenzene, 4,5-di-tert-pentyl-1,2-dimethoxybenzene and 4,5-di-tert-butyl-1,2-diethoxybenzene; substituted alkoxynaphthalenes such as 4,8-di-tert-butyl-1,5-dimethoxynaphthalene; polycyclic compounds such as 1-(3-(2,4-cyclopentadien-1-ylidene)-1-butenyl)4-methoxybenzene, 9,10-dimethoxy-1,4:5,8-dimethano-1,2,3,4,5,6,7,8-octahydroanthracene and 9,10-dimethoxy-1,4:5,8-diethano-1,2,3,4,5,6,7,8-octahydroanthracene; and salts such as 3-amino-n-dodecyl-4-methoxybenzene-sulfonamide and 3-methoxybenzyl bromide.

Mixtures of two or more shuttles having different electrochemical potentials vs. $Li/Li^+$ may also be employed. For example, a first shuttle operative at 3.8V and a second shuttle operative at 3.9V may both be employed in a single cell. If after many charge/discharge cycles the first shuttle degrades and loses its effectiveness, the second shuttle (which would not meanwhile have been oxidized to form its radical cation while the first shuttle was operative) could take over and provide a further (albeit higher potential) margin of safety against overcharge or overdischarge damage.

The shuttle electrolyte solubility may be improved through addition of a suitable cosolvent. Exemplary cosolvents include aromatic materials compatible with Li-ion cells containing cyclic ester-based electrolytes. Representative cosolvents include toluene, sulfolane, dimethoxyethane, combinations thereof and other materials that will be familiar to those skilled in the art. The electrolyte may include other additives that will familiar to those skilled in the art.

Normally each cell in the disclosed batteries will contain the same components. This is however not a requirement. Thus the disclosed batteries may be made using, for example, different negative electrodes in different cells, different negative or positive current collectors in different cells, and so on.

The disclosed batteries may be used in a variety of devices, including portable computers, tablet displays, personal digital assistants, mobile telephones, motorized devices (e.g, personal or household appliances and vehicles), instruments, illumination devices (e.g., flashlights) and heating devices. The disclosed batteries may have particular utility in low-cost mass market electrical and electronic devices such as flashlights, radios, CD players and the like, which heretofore have usually been powered by non-rechargeable batteries such as alkaline cells. Further details regarding the construction and use of the disclosed batteries will be familiar to those skilled in the art.

The invention is further illustrated in the following illustrative examples, in which all parts and percentages are by weight unless otherwise indicated.

EXAMPLE 1 AND COMPARISON EXAMPLE 1

Negative electrodes were made from $Li_{4/3}Ti_{5/3}O_4$ (synthesized according to the procedure shown in K. M. Colbow, R. R. Haering and J. R. Dahn, "Structure and Electrochemistry of the Spinel Oxides $LiTi_2O_4$ and $Li_{4/3}Ti_{5/3}O_4$", *J. Power Sources* 26, 397-402 (1989)) using the following procedure. 100 Parts of $Li_{4/3}Ti_{5/3}O_4$, 5 parts KYNAR™301P polyvinylidene fluoride (commercially available from Atofina Chemicals, Philadelphia, Pa.) and 5 parts SUPER S™Carbon Black (commercially available from MMM Carbon, Tertre, Belgium) were mixed with N-methylpyrrolidinone to form a slurry. After extensive mixing in a polyethylene bottle containing spheres of ZIRCOA™6.35 mm diameter zirconium oxide banded satellite spherical media (commercially available from Zircoa, Inc., Solon, Ohio), the slurry was coated in a thin film on an aluminum foil current collector. The resulting coated electrode foil was dried in air overnight at 90° C. Individual 1.3 cm diameter electrode discs were cut from the electrode foil using a precision punch. Positive electrodes were made the same way using $LiFePO_4$ (commercially available from Phostech Lithium, Ste-Foy, Quebec, Canada) as the active material.

Electrolytes were prepared by mixing together the lithium salt lithium bisoxalatoborate ("LiBOB", commercially available from Chemetall Group of Dynamit Nobel AG, Troisdorf, Germany) and the charge carrying media propylene carbonate ("PC", obtained from E-One/Moli Energy) and dimethyl carbonate ("DMC", obtained available from E-One/Moli Energy) in amounts sufficient to provide a 0.8 M solution of LiBOB in a 1:2 PC:DMC mixture. A quantity of the redox chemical shuttle 2,5-di-tert-butyl-1,4-dimethoxybenzene (CAS No. 7323-63-9, commercially available from Aldrich Chemical Co. as Catalog No. S661066) sufficient to provide a 0.08 M solution was added to the electrolyte used in assembling the Example 1 battery. No shuttle was added to the electrolyte used in assembling the Comparison Example 1 battery.

Figure 13:
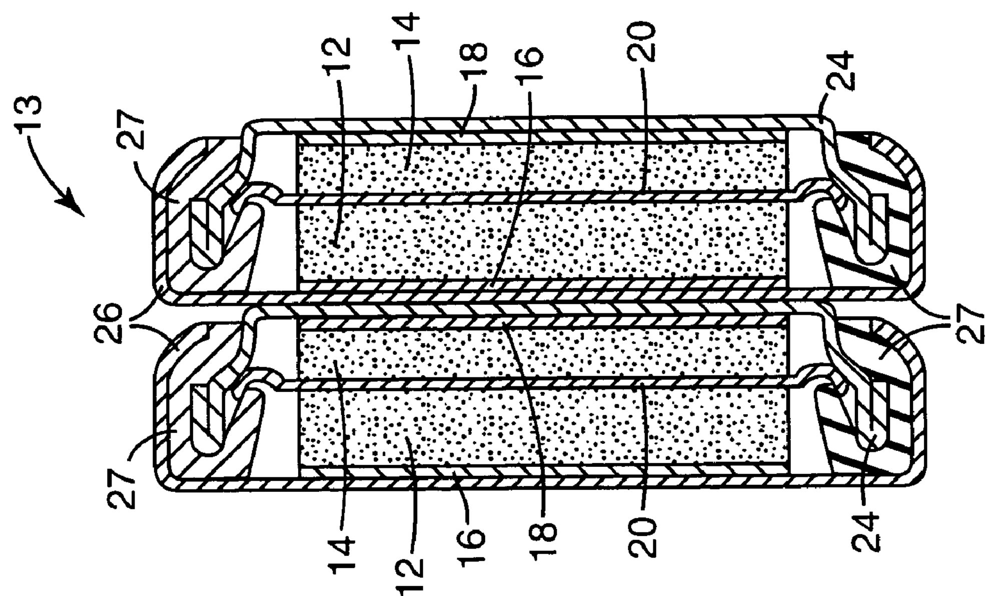
FIG. 13 is a cross-sectional view of a battery.
Figure 12:
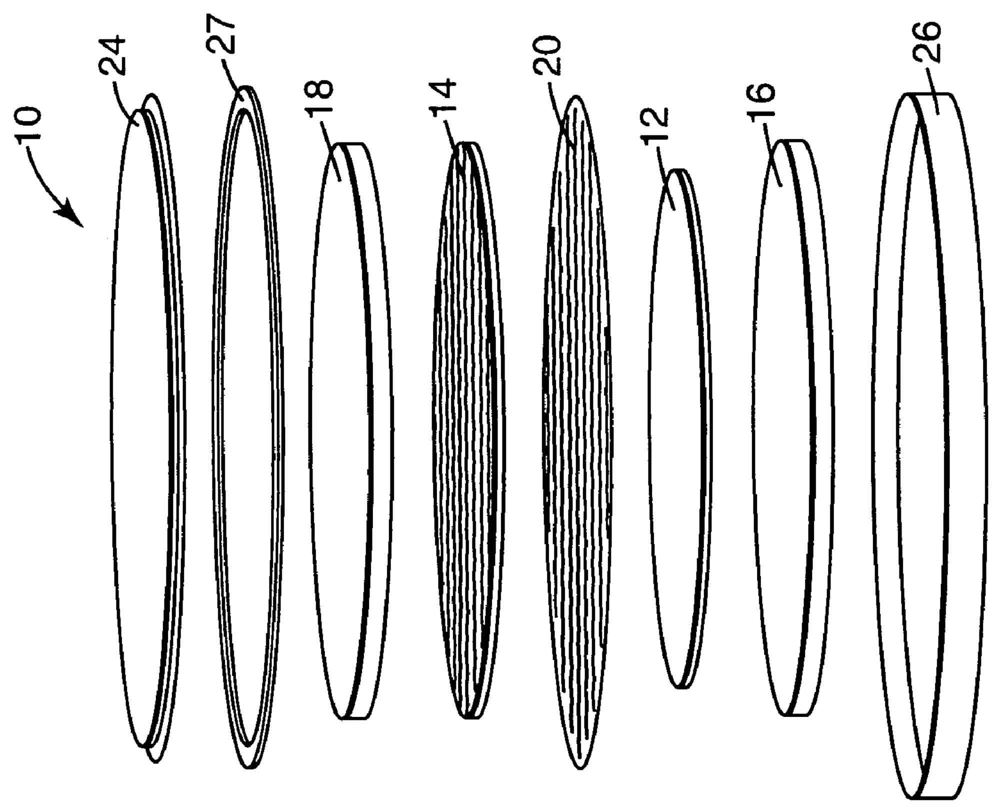
FIG. 12 is an exploded perspective schematic view of an electrochemical cell.

Coin-type test cells were built in 2325 coin cell hardware as described in A. M. Wilson and J. R. Dahn, *J. Electrochem. Soc.,* 142, 326-332 (1995). An exploded perspective schematic view of a 2325 coin cell 10 is shown in FIG. 12. Stainless steel cap 24 and oxidation resistant case 26 contain the cell and serve as the negative and positive terminals respectively. The negative electrode 14 was formed from $Li_{4/3}Ti_{5/3}O_4$ coated on aluminum foil current collector 18 as described above. The positive electrode 12 was formed from $LiFePO_4$ coated on aluminum foil current collector 16 as described above. Separator 20 was formed from CELGARD™ No. 2500 microporous material having a 25micrometer thickness, and wetted with electrolyte. Gasket 27 provided a seal and separated the two terminals. A tightly squeezed stack was formed when the cell was crimped closed. By placing a plurality of lithium-ion cells in a series-connected relationship, a battery can be assembled. FIG. 13 is a cross-sectional view of a battery 13 made from two series-connected 2325 coin cells whose components are numbered as in FIG. 12.

The Example 1 battery was assembled using three 2325 coin cells whose electrolyte contained the shuttle. All of the cells had a greater negative electrode capacity than positive electrode capacity as shown in FIG. 1. Two of the cells were configured in a slightly imbalanced configuration, which is with the negative electrode capacity slightly exceeding the positive electrode capacity. One cell was deliberately assembled in a very imbalanced configuration, that is with a positive electrode whose capacity was only about ⅔ that of the positive electrode capacity of the normal cells. This latter cell was referred to as the "weak cell". The Comparison Example 1 battery was assembled in the same way, with a similar weak cell, but using electrolyte that did not contain the shuttle in all cells.

The $Li_{4/3}Ti_{5/3}O_4$ negative electrodes and the two stronger cell $LiFePO_4$ positive electrodes each had a specific capacity of 140 mAh/g. Thus a specific current of 140 mA/g could discharge the fully charged electrodes in one hour, and 140 mA/g represented a "1C" rate for cells containing these electrodes. The assembled batteries were cycled at 30° C. at a "C/4" (four hour charge and four hour discharge) rate using a computer-controlled charge-discharge testing unit produced by E-One/Moli Energy, with charging to a battery potential of about 7 volts and discharging to 0 volts. The intended charging potential cut-off for the individual cells was about 2.34 volts vs. $Li_{4/3}Ti_{5/3}O_4$. Because $Li_{4/3}Ti_{5/3}O_4$ has a plateau potential near 1.56 V vs. $Li/Li^+$. a potential cut-off of 2.34 V vs. $Li_{4/3}Ti_{5/3}O_4$ corresponded to a potential of about 3.9 V vs. $Li/Li^+$.

Figure 2:
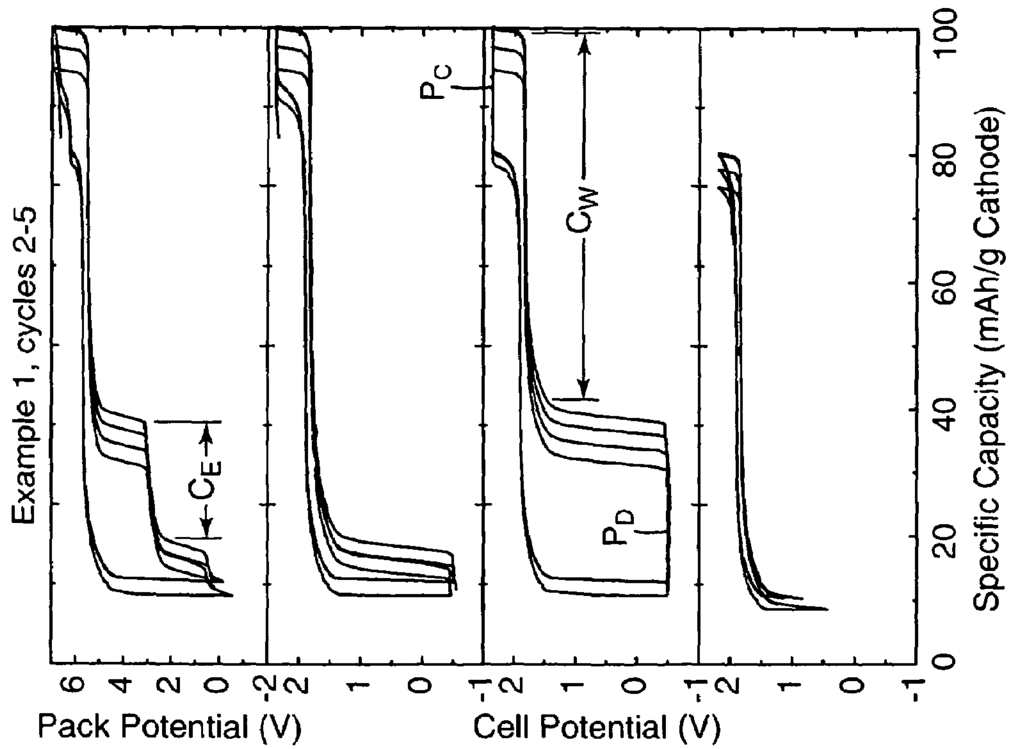
FIG. 2 is a four panel plot showing the battery and cell potential (viz., the battery and cell terminal voltage) versus cathode specific capacity for the Example 1battery (top panel) and for its 3 individual cells (remaining panels) during 2 to 5 test cycles.

FIG. 2 is a four panel plot showing the battery and cell potential (viz., the battery and cell terminal voltage) versus cathode specific capacity for the Example 1 battery (top panel) and for its 3 individual cells (remaining panels) during 2 to 5 test cycles. The second panel from the bottom illustrates the weak cell's behavior. The weak cell experienced overcharge and overdischarge during the test, and the remaining cells experienced charge and discharge during the test. Unless otherwise indicated we will refer to the test cycles as "overcharge/overdischarge" cycles, it being understood that the recited overcharge and overdischarge primarily involved the weak cell. There is a small horizontal cycle-to-cycle shift in the plotted cycles. This is believed to be primarily an artifact of the instrumentation and measurement software employed, and not a material shift in the actual cell performance. The weak cell had lower capacity than the other two cells, as indicated by the relatively short horizontal distance $C_W$ between the weak cell's voltage inflection points during an overcharge/overdischarge cycle. The shuttle served to clamp the weak cell's positive and negative electrode potentials during each cycle. This is indicated by the extended flat voltage plateaus $P_C$ and $P_D$ at the ends of each cycle. The weak cell's negative electrode was forced into reversal (and to a potential above that of the positive electrode) by the continued discharge of the two stronger cells after the weak cell fully discharged. This is indicated by the negative cell potential for plateau $P_D$. The onset of weak cell negative electrode reversal can also be seen in the battery potential plot (top panel) of FIG. 2, near the extra capacity region $C_E$. By employing the shuttle, the extra capacity region $C_E$ is made safely available for use during discharge.

Figure 3:
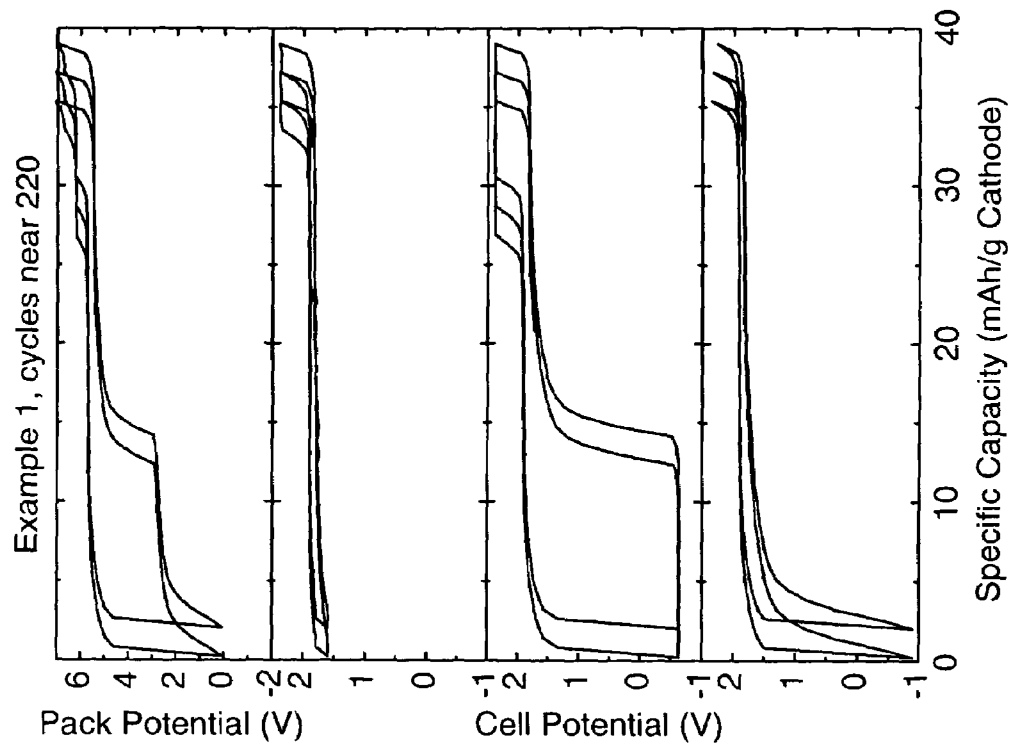
FIG. 3 is a four panel plot showing potential versus cathode specific capacity for the Example 1 battery and its 3 individual cells after 220 cycles.

FIG. 3 shows the Example 1 battery and cell potentials after 220 cycles. The horizontal axis in FIG. 3 (and in some of the subsequent similar figures) is drawn using a different scale than in FIG. 2. The shuttle continued to permit weak cell reversal and full battery discharge. The top panel plot shows that the Example 1 battery substantially maintained its capacity despite the severity of the test conditions.

Figure 4:
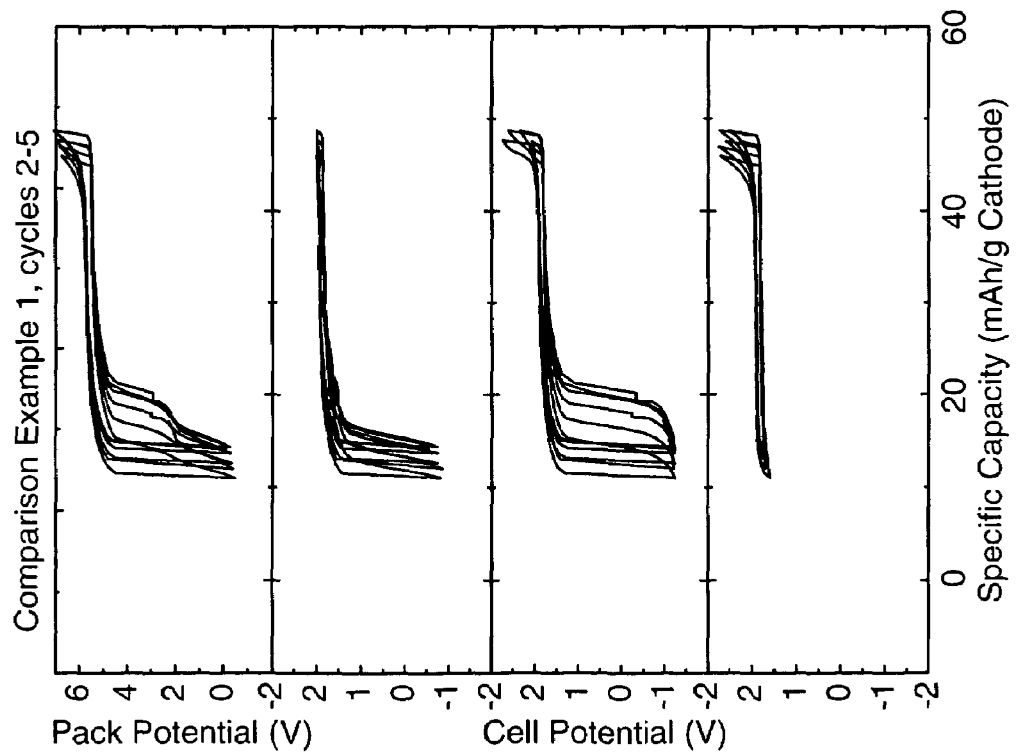
FIG. 4 is a four panel plot showing potential versus cathode specific capacity for the Comparison Example 1 battery and its 3 individual cells during 2 to 5 cycles.

FIG. 4 shows the Comparison Example 1 battery and cell potentials during 2 to 5 cycles. The second panel from the bottom illustrates the weak cell's behavior. The vertical axis in FIG. 4 (and in some of the subsequent similar figures) is drawn using a different scale than in FIG. 2 and FIG. 3. The weak cell does not exhibit the shuttle-induced flat voltage plateaus $P_C$ and $P_D$ shown in FIG. 2. During overcharge the Comparison Example 1 weak cell is driven to a higher potential than the Example 1 weak cell, and during overdischarge the Comparison Example 1 weak cell is driven to a lower potential than the Example 1 weak cell. The observed cell potential at overdischarge reaches about −1.2 V, indicating that the negative electrode potential reaches about 1.2 V above the positive electrode potential. Because $LiFePO_4$ has a potential of about 3.5 V vs. $Li/Li^+$, the negative electrode potential at overdischarge thus reaches about 4.7 V vs. $Li/Li^+$. This is sufficiently high to cause decomposition of the electrolyte, by oxidation of the electrolyte at $Li_{4/3}Ti_{5/3}O_4$.

Figure 5:
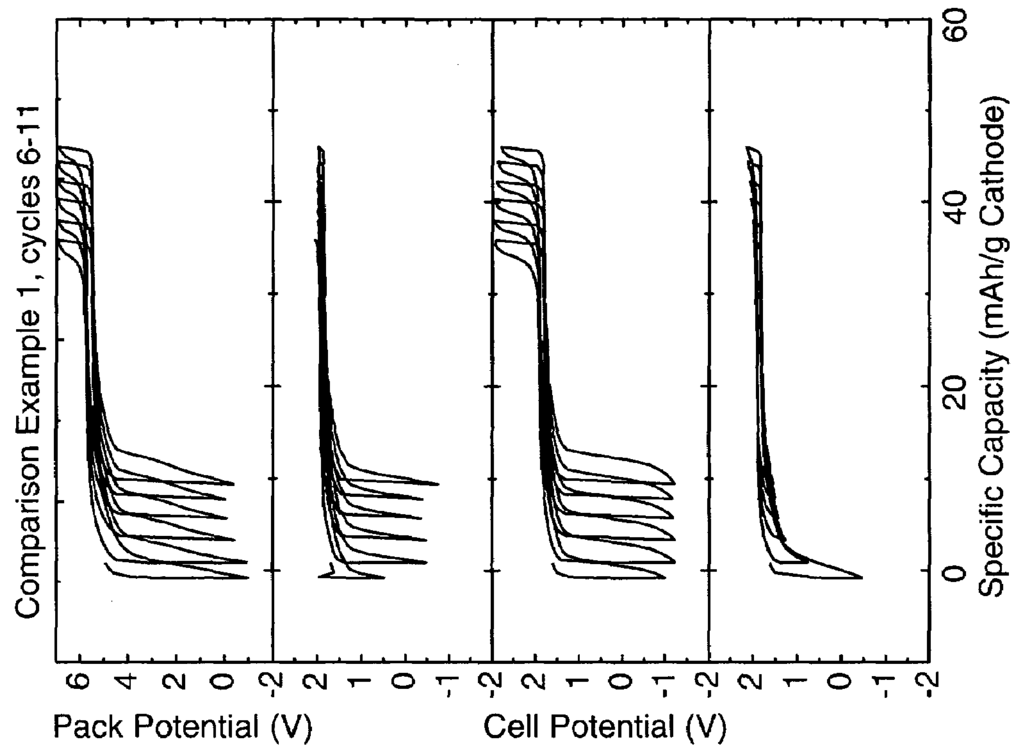
FIG. 5 is a four panel plot showing potential versus cathode specific capacity for the Comparison Example 1 battery and its 3 individual cells during 6 to 11 cycles.

FIG. 5 shows the Comparison Example 1 battery and cell potentials during 6 to 11 cycles. The weak cell continues to be driven to high potential during overcharging and low potential during overdischarging. At overcharging the weak cell potential reaches about 3.0 V, or about 4.5 V vs. Li/Li$^+$. This is sufficiently high to cause decomposition of the electrolyte, by oxidation of the electrolyte at $LiFePO_4$. The weak cell also continues to be driven to a sufficiently low potential during overdischarge to cause decomposition of the electrolyte by oxidation at $Li_{4/3}Ti_{5/3}O_4$.

Figure 6:
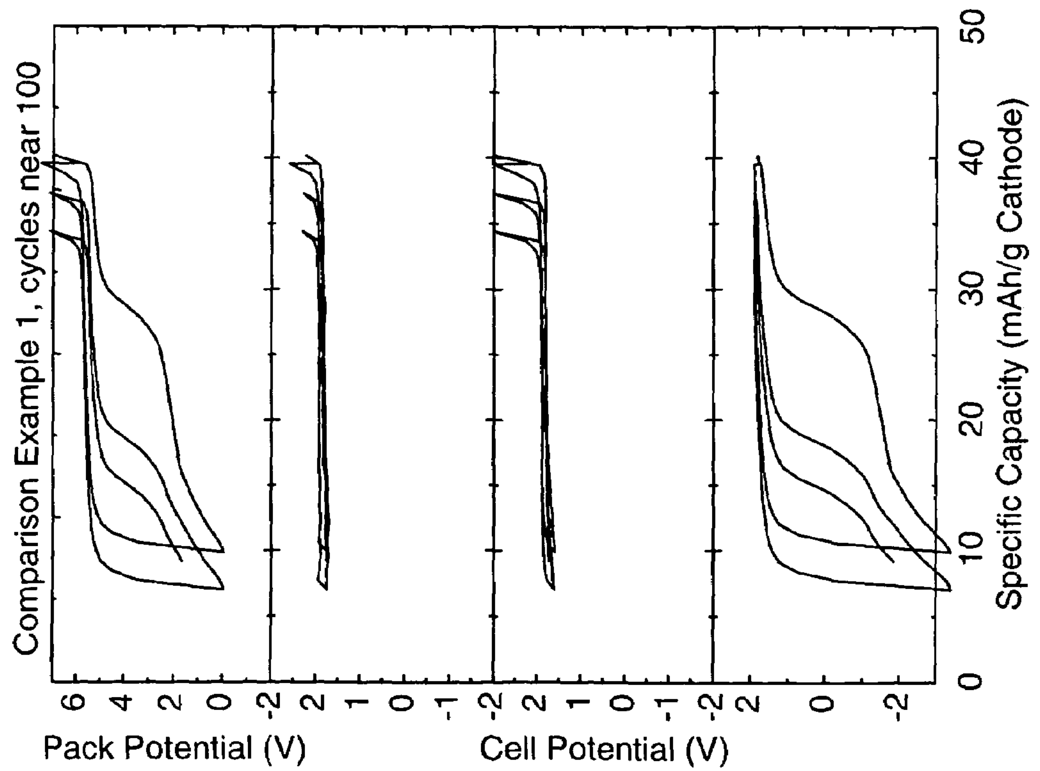
FIG. 6 is a four panel plot showing potential versus cathode specific capacity for the Comparison Example 1 battery and its 3 individual cells after 100 cycles.

FIG. 6 shows the Comparison Example 1 battery and cell potentials after 100 cycles. The cells have become imbalanced, with the formerly stronger cell shown in the lower panel now being driven into substantial reversal. The cell potential falls to below −3 V, indicating that the negative electrode potential is more than 3.0 V above the positive electrode potential or over 6.5 V vs. Li/Li$^+$. At this point electrolyte decomposition is rampant.

Figure 7:
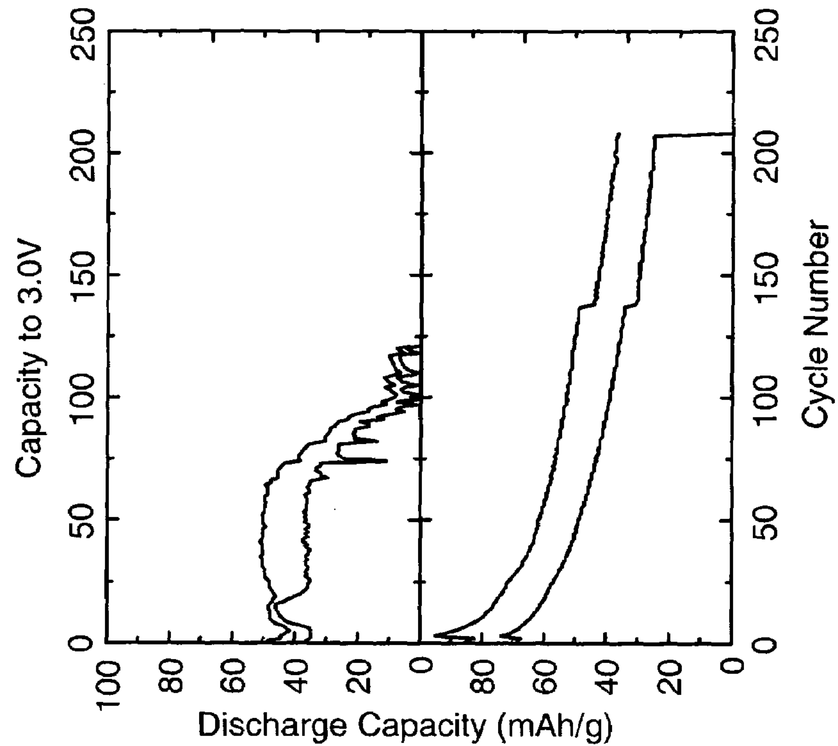
FIG. 7 is a two panel plot comparing the discharge capacity for the Comparison Example 1 battery (top panel) and the Example 1 battery (bottom panel) as a function of charge-discharge cycle number.

FIG. 7 is a two panel plot comparing the discharge capacity for the Comparison Example 1 battery (top panel) and the Example 1 battery (bottom panel) after test cycling between 3.0 V and 0 V. The Comparison Example 1 battery lost virtually all its capacity after about 100 cycles, whereas the Example 1 battery remained usable after 220 cycles.

EXAMPLE 2

Figure 8:
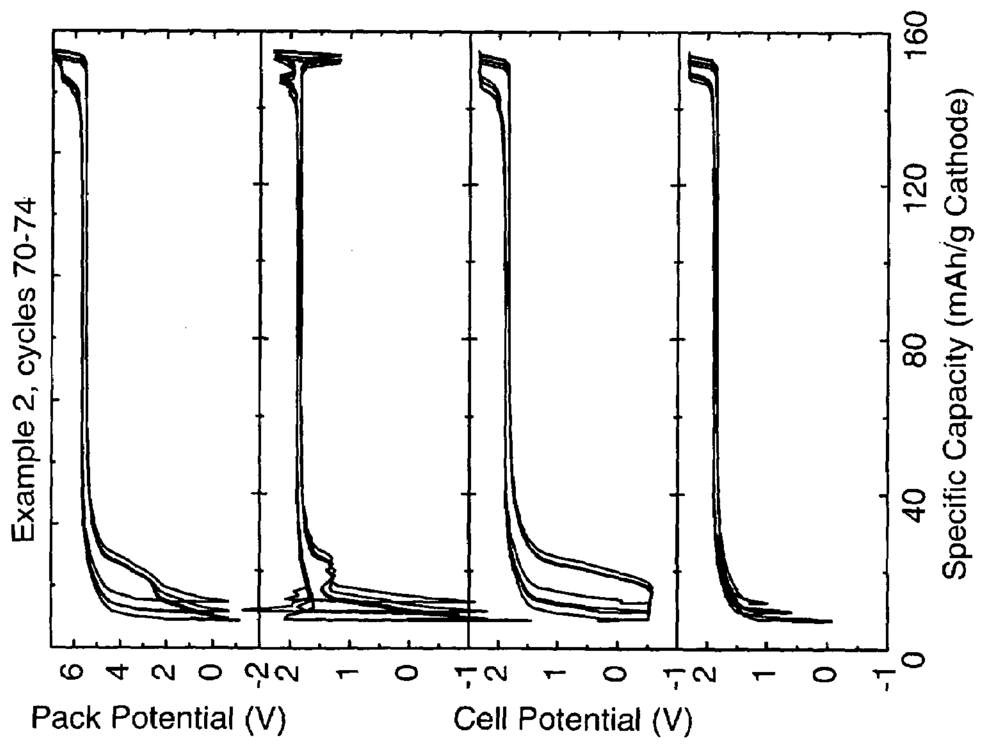
FIG. 8 is a four panel plot showing battery and cell potential versus cathode specific capacity for the Example 2 battery (top panel) and for its 3 individual cells (remaining panels) during 70 to 74 test cycles.

Using the general method of Example 1, a three-cell battery was assembled from two stronger cells and one weak cell, but using the lithium salt $LiPF_6$ (manufactured by Stella Chemifa Corp., Japan and obtained from E-One/Moli Energy) rather than LiBOB in the electrolyte. FIG. 8 is a four panel plot showing battery and cell potential versus cathode specific capacity for the Example 2 battery (top panel) and for its 3 individual cells (remaining panels) after 70 to 74 cycles. The second panel from the bottom illustrates the weak cell's behavior. The shuttle provided overcharge and overdischarge protection and permitted the weak cell's negative electrode to be driven into reversal while preventing the negative electrode from reaching a destructively high potential.

The second panel from the top includes high and low voltage spikes at the left end of the drawing. These were measurement artifacts, caused by measuring the potential of only two of the cells and of the battery as a whole and using those values to calculate the third cell's potential. During the time periods required to make an entire set of measurements the cell and battery potentials were undergoing rapid change. This caused a timing error that affected the calculated third cell potential. The actual cell potential is believed to have been much more stable than shown.

EXAMPLE 3

Figure 9:
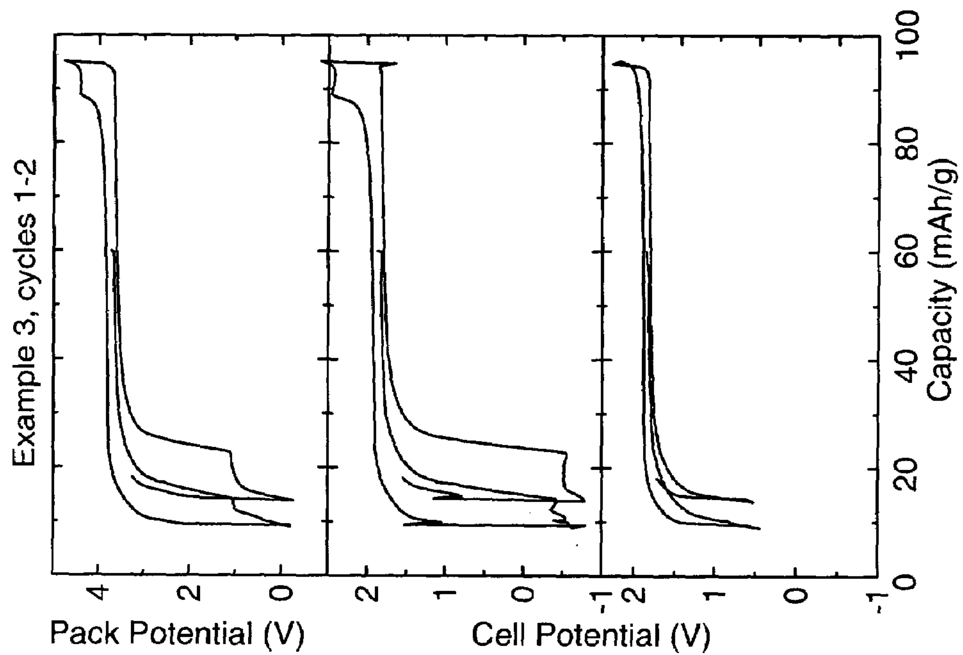
FIG. 9 is a three panel plot showing battery and cell potential versus cathode specific capacity for the Example 3 battery and its weak (middle panel) and strong (bottom panel) cells during 1 to 2 test cycles.
Figure 11:
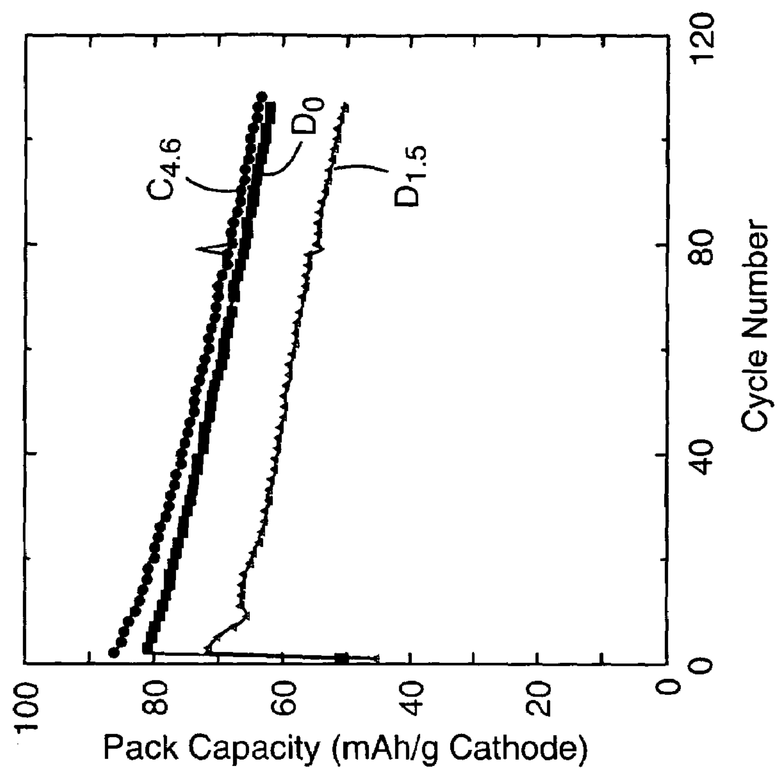
FIG. 11 is a plot showing charge and discharge capacity versus cycle number for the Example 3 battery.
Figure 10:
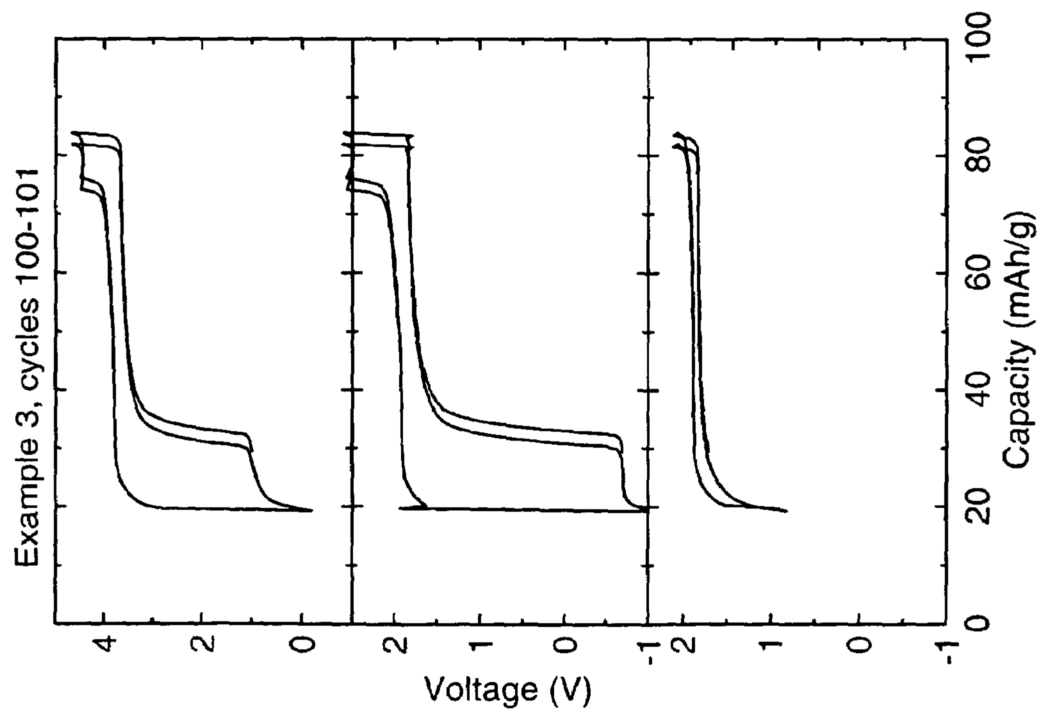
FIG. 10 is a three panel plot showing potential versus cathode specific capacity for the Example 3 battery and its weak and strong cells during 100 to 101 cycles.

Using the general method of Example 1, a two-cell battery was assembled from two used cells that had already been subjected to overcharge/overdischarge cycling. Each cell employed a $Li_{4/3}Ti_{5/3}O_4$ negative electrode on a copper current collector and a $LiFePO_4$ positive electrode on an aluminum current collector. The first cell had been cycled between 2.4 and 0 V at a "C/2" (two hour charge and two hour discharge) rate for 57 cycles, using a 100% overcharge (viz., an overcharge charge flow equivalent to 100% of the cell capacity) during each charging cycle, then at a "C/5" (five hour charge and five hour discharge) rate for a further 10 cycles. The second cell had been cycled between 2.4 and 0 V at a C/4 rate for 10 cycles, using a 100% overcharge during each charging cycle. Owing in part to their different cycling history, these cells now had different capacities, with the second cell exhibiting weaker behavior. The cells were assembled into a two-cell pack and cycled between 4.6 and 0 V. FIG. 9 is a three panel plot showing battery and cell potential versus cathode specific capacity for the Example 3 battery and its weak (middle panel) and strong (bottom panel) cells during 1 to 2 cycles. FIG. 10 is a three panel plot showing potential versus cathode specific capacity for the Example 3 battery and its weak and strong cells during 100 to 101 cycles. As shown in the middle panel plots, the shuttle provided overcharge and overdischarge protection and permitted the weak cell's negative electrode to be driven into reversal while preventing the negative electrode from reaching a destructively high potential. FIG. 11 is a plot showing charge and discharge capacity versus cycle number for the Example 3 battery. Curve $C_{4.6}$ illustrates the battery's charge capacity after charging to 4.6 V. Curve $D_O$ illustrates the battery's discharge capacity after discharging to 0 V. Curve $D_{1.5}$ illustrates the battery's discharge capacity after discharging to 1.5 V. As shown in FIG. 11, the battery continued to function well after over 100 cycles despite being made up from previously abusively cycled cells.

A number of embodiments of the invention have been described. Nevertheless, it will be understood that various modifications may be made without departing from the spirit and scope of the invention. Accordingly, other embodiments are within the scope of the following claims.

We claim:

1. A battery comprising a plurality of series-connected rechargeable lithium ion cells each comprising a negative electrode; a negative electrode current collector; a positive electrode; a positive electrode current collector; and an electrolyte comprising charge carrying medium, lithium salt and cyclable redox chemical shuttle, wherein the negative electrode has a larger irreversible first cycle capacity loss than the positive electrode, the redox chemical shuttle has an electrochemical potential above the positive electrode maximum normal operating potential, the negative current collector has a lithium alloying potential below the negative electrode minimum normal operating potential, and wherein the redox chemical shuttle comprises an aromatic compound substituted with at least one tertiary carbon organic group and at least one alkoxy group.

2. A battery according to claim 1 wherein the plurality of cells can be discharged to 0 volts and recharged a plurality of times without substantially irreversibly reducing the recharge capacity of any cell.

3. A battery according to claim 1 comprising at least one weak cell having lower recharge capacity than at least one other cell, and wherein when the plurality of cells is discharged to 0 volts, the weak cell negative electrode potential increases to but does not exceed the shuttle oxidation potential.

4. A battery according to claim 1 wherein the redox chemical shuttle can provide the battery with overdischarge protection after at least 5 charge-discharge cycles at a charging voltage sufficient to oxidize the shuttle to its radical cation and an overcharge charge flow equivalent to 100% of the battery capacity during each cycle, and at a discharge to a battery potential of zero volts during each cycle.

5. A battery according to claim 1 wherein the redox chemical shuttle can provide the battery with overdischarge protection after at least 100 charge-discharge cycles at a charging voltage sufficient to oxidize the shuttle to its radical cation and an overcharge charge flow equivalent to 100% of the battery capacity during each cycle, and at a discharge to a battery potential of zero volts during each cycle.

6. A battery according to claim 1 wherein the negative electrode has a larger capacity than the positive electrode and the redox chemical shuttle can provide the battery with overcharge protection after at least 100 charge-discharge cycles at a charging voltage sufficient to oxidize the shuttle to its radical cation and an overcharge charge flow equivalent to 100% of the battery capacity during each cycle.

7. A battery according to claim 1 wherein the negative electrode comprises $Li_{4/3}Ti_{5/3}O_4$or graphite.

8. A battery according to claim 1 wherein the negative electrode current collector has a dissolution potential above the shuttle reduction potential.

9. A battery according to claim 1 wherein the negative electrode current collector comprises aluminum.

10. A battery according to claim 1 wherein the negative electrode current collector and positive electrode current collector are made of the same material.

11. A battery according to claim 1 wherein the positive electrode comprises $LiFePO_4$.

12. A battery according to claim 1 wherein the negative electrode comprises $Li_{4/3}Ti_{5/3}O_4$, the negative electrode current collector comprises aluminum and the positive electrode comprises $LiFePO_4$.

13. A battery according to claim 1 wherein the charge carrying medium comprises ethylene carbonate, propylene carbonate, dimethyl carbonate, diethyl carbonate, dimethoxyethane or combination thereof, and the lithium salt comprises $LiPF_6$, lithium bis(oxalato)borate or combination thereof.

14. A battery according to claim 1 wherein the redox chemical shuttle comprises 2,5-di-tert-butyl-1,4-dimethoxybenzene.

15. A battery according to claim 1 wherein the redox chemical shuttle has an electrochemical potential from about 3.7 to about 4.2 V vs. $Li/Li^+$.

16. A battery according to claim 1 in the form of a replaceable battery pack without electronic overdischarge or electronic overcharge protection circuitry.

17. An electrical device comprising a) and electrical load and b) a battery comprising a plurality of series-connected rechargeable lithium ion cells each comprising a negative electrode; a negative electrode current collector; a positive electrode; a positive electrode current collector; and an electrolyte comprising charge carrying medium, lithium salt and cyclable redox chemical shuttle, wherein the negative electrode has a larger irreversible first cycle capacity loss than that of the positive electrode, the redox chemical shuttle has an electrochemical potential above the positive electrode maximum normal operating potential, the negative current collector has a lithium alloying potential below the negative electrode minimum normal operating potential, and wherein the redox chemical shuttle comprises an aromatic compound substituted with at least one tertiary carbon organic group and at least one alkoxy group.

18. A device according to claim 17 wherein the load comprises a portable computer, tablet display, personal digital assistant or telephone.

19. A device according to claim 17 wherein the load comprises a motor, illumination source or heat source.

20. A device according to claim 17 wherein the negative electrode comprises $Li_{4/3}Ti_{5/3}O_4$, the negative electrode current collector comprises aluminum and the positive electrode comprises $LiFePO_4$.

21. A device according to claim 17 wherein the redox chemical shuttle comprises 2,5-di-tert-butyl-1,4-dimethoxybenzene.

22. A device according to claim 17 without electronic overdischarge protection circuitry.

23. A device according to claim 17 without electronic overcharge protection circuitry.

* * * * *

UNITED STATES PATENT AND TRADEMARK OFFICE

CERTIFICATE OF CORRECTION

PATENT NO. : 7,648,801 B2
APPLICATION NO. : 11/095185
DATED : January 19, 2010
INVENTOR(S) : Dahn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1329 days.

Signed and Sealed this

Twenty-third Day of November, 2010

David J. Kappos
*Director of the United States Patent and Trademark Office*

UNITED STATES PATENT AND TRADEMARK OFFICE

CERTIFICATE OF CORRECTION

PATENT NO. : 7,648,801 B2
APPLICATION NO. : 11/095185
DATED : January 19, 2010
INVENTOR(S) : Jeffrey Dahn It is certified that error appears in the above-identified patent and that said Letters Patent is hereby corrected as shown below:

Title Page,
Item [57], ABSTRACT, delete “i rreversible” and insert --irreversible-- therefor.

Column 3,
Line 65, delete “1battery” and insert --1 battery-- therefor.

Column 10,
Line 64, delete “KYNAR™301P” and insert --KYNAR™ 301P-- therefor.

Column 10,
Line 66, delete “S™Carbon” and insert --S™ Carbon-- therefor.

Column 11,
Line 3, delete “ZIRCOA™6.35” and insert --ZIRCOA™ 6.35-- therefor.

Column 11,
Line 40, delete “25micrometer” and insert --25 micrometer-- therefor.

Column 12,
Lines 26-27, delete “$C_W$between” and insert --$C_W$ between-- therefor.

Column 12,
Line 39, delete “$C_E$is” and insert --$C_E$ is-- therefor.

Column 14,
Line 15, delete “$D_O$illustrates” and insert --$D_0$ illustrates-- therefor.

Column 14,
Line 16, delete “$D_{1.5}$illustrates” and insert --$D_{1.5}$ illustrates-- therefor.

Signed and Sealed this
Twenty-sixth Day of July, 2011

David J. Kappos
*Director of the United States Patent and Trademark Office*

Column 14,
Line 33, in Claim 1, after "than" insert --that of-- therefor.

Column 16,
Line 1, in Claim 17, delete "and" and insert --an-- therefor.